3,361,278
DUMP TRUCK LOADING APPARATUS
James L. Sperling, N. Main St.,
Mannsville, N.Y. 13661
Filed June 29, 1966, Ser. No. 561,556
7 Claims. (Cl. 214—501)

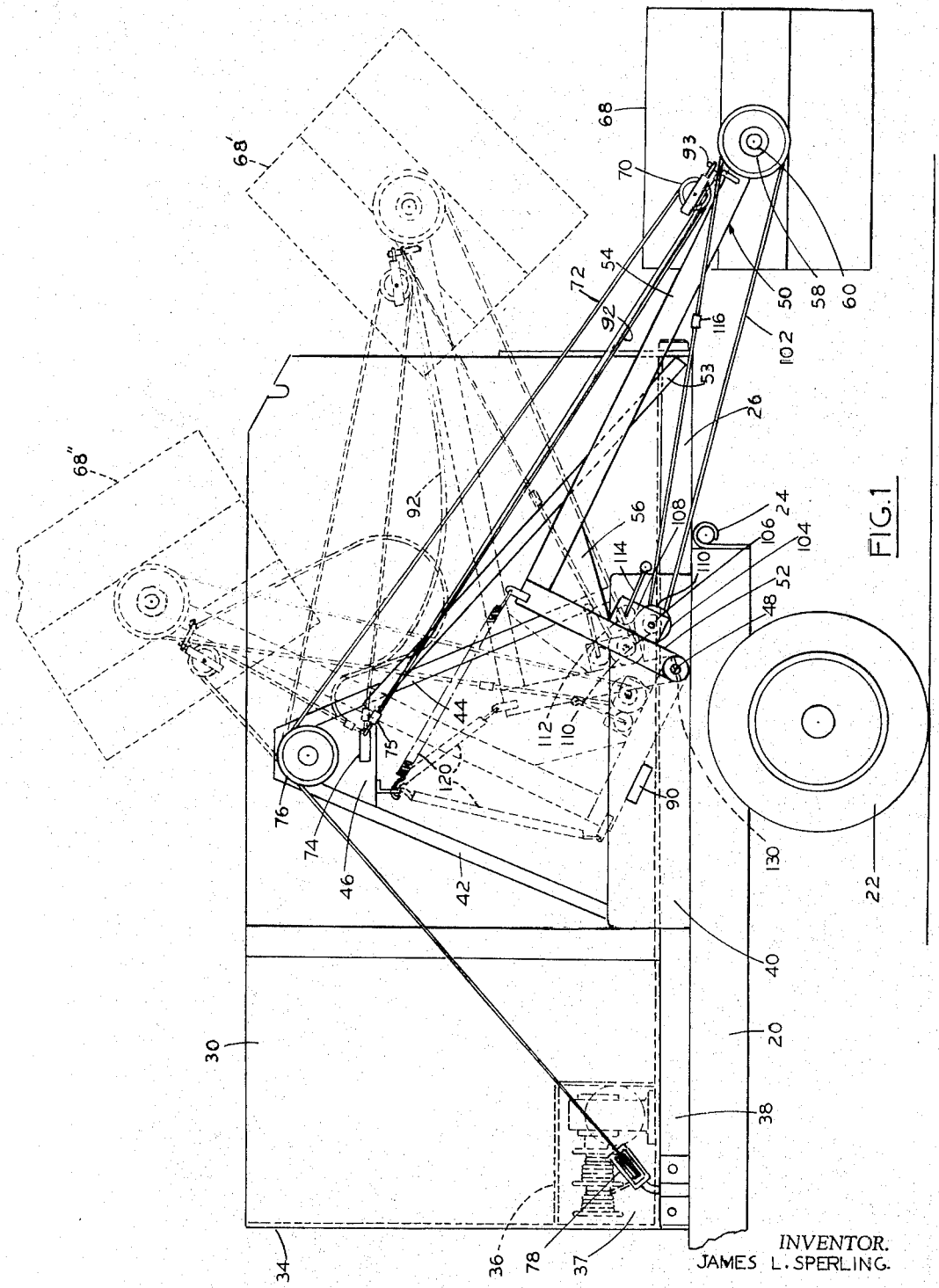

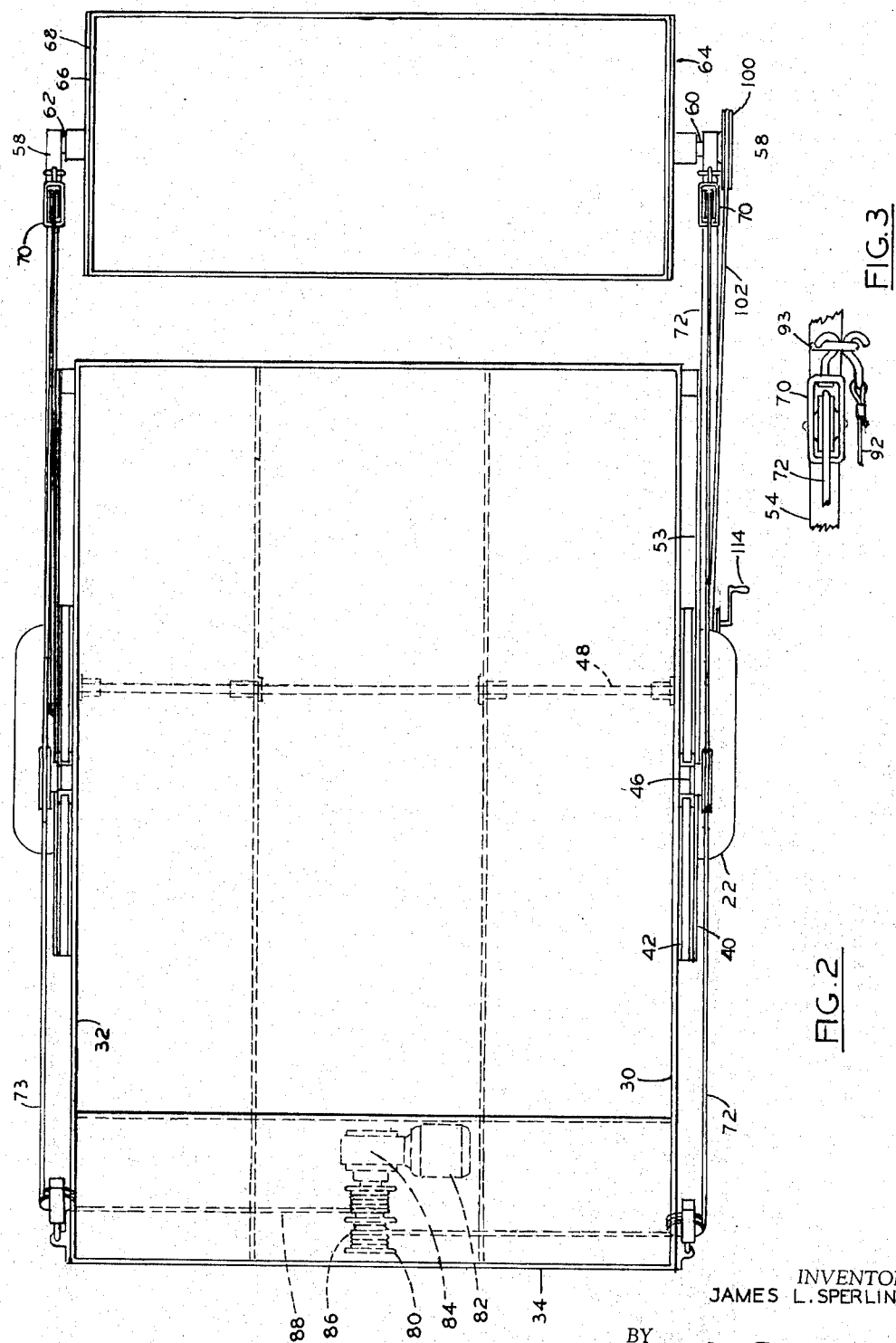

ABSTRACT OF THE DISCLOSURE

The truck is provided with a relatively large loading bucket, which can be lowered almost to street level, for receiving the contents of the usual household containers for trash and garbage. When the bucket is filled, it is power lifted and readily dumped into the truck body. In its lowered position, the bucket is held at such a height as to clear the street pavement, so the truck can be driven from house to house, without lifting the bucket until such time as it is filled. Thereupon the bucket is power lifted to a position over the truck where it can be readily dumped, and thereafter returned to loading position. The extreme positions taken by the apparatus are resiliently resisted by tension springs to facilitate the start of movement from the loading and unloading positions. The apparatus is so applied to the truck as to be readily removed and replaced, so as to leave the truck free for other uses as desired.

---

This invention relates to loading apparatus for dump trucks and the handling of rubbish, trash and refuse.

In the collection of trash, rubbish, refuse or garbage, it has been usual to lift many small containers to a height sufficient to dump the containers into the truck. Such practice is tedious and time consuming, and in general requires two or more collectors. The present invention is directed to a dump truck loading apparatus which is readily served by a single operation.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevation of the dump truck loading apparatus;

FIGURE 2 is a top plan view of the apparatus; and

FIGURE 3 is an enlarged fragmentary detailed view of the lifting tackle and limiting cable attachment to the lifting arms.

Referring to FIGURE 1 of the drawings, there is shown the rear portion of a truck chassis frame 20 mounted on rear wheels 22 of any standard construction. Pivotally mounted at the rear end of the chassis frame, as at 24 is the under frame 26 of a dump body, the forward end of which is adapted to be lifted by hydraulic or other well known means, not shown, acting between the chassis frame 20 and the dump body under frame 26. The dump body has side walls 30 and 32, a forward wall 34, which map have a step 36, forming a lower forward transverse recess 37, for power actuation apparatus.

The side member, such as 38 of the dump body under frame on opposite sides, are provided with plates such as 40 and extending upwardly from the members 38 are A-frame members 42 and 44 converging at their upper ends and having triangular plates 46, welded to the inside approaching faces of the members 42 and 44. The members 42 and 44 may be of box section formed by two facing channel members welded together along their edges.

A transverse shaft 48, extends through the dump body under frame, and projects through the plates 40 and there beyond a sufficient distance to receive the ends of L-shaped arms 50 comprising a short section 52 joined to the bucket supporting arm 54, the section 52 and the arm 54 being rigidly welded or otherwise secured together and adequately braced as by the angular plate 56. The arms 54 and section 52 are of such length as to project beyond the rear of the dump body and are each provided with a journal 58 adapted to receive the oppositely extending stub shafts 60 and 62 affixed to the side walls 64 and 66 of the bucket 68, shown as of generally rectangular shape.

In order to lift the arms 50 simultaneously and in unison, each arm is provided with a pulley block 70 over which a cable 72 extends, the cable having a looped end 75 fixed to the A-frame as at 74, with one end passing over a pulley 7 journalled on the A-frame. The cable extends to the stepped recess 37, passing over an inclined pulley 78 to a power winch 80, comprising a motor 82, gear reduction 84, and cable drums 86 and 88, one drum being for the cable 72 on one side, and the other drum being adapted to wind the cable 73 on the other side. The motor 82 is reversible, and may have a brake to hold the lifted arms 50 in any position desired, the brake released on motor energization, as will be understood in the art. As the arms 50 are lifted or are lowered, the struts 53, on either side of the dump body act as guides to prevent any lateral sway of the arms 50.

In order to limit the upper movement of the arms 50, the short section 52 may be employde to engage shoulder stops 90 affixed to the plates 40 on the opposite sides of the dump frame. In order to limit the lower movement of the arms 50, the other end 92 of the cable loop 75 of each cable 72 and 73 extends to the outer ends of their respective arms 54. Such cables, will preferably be adjusted so as to hold the bucket above the ground, by about six inches so that, the truck can be moved from location to location in the course of filling the bucket, without the bucket dragging, or requiring lifting of the bucket, until filled.

In order to tilt the bucket to clear the tail gate 99 or for unloading, when elevating past the position indicated at 68' and to the position indicated at 68", one of the stub shafts, 60 is provided with a pulley 100 over which extends a cable 102, which extends to a drum 104 rotatably mounted on a stub shaft 106 mounted on a plate 108 affixed to the arm 52. The cable is wrapped around the drum a number of turns, and a portion affixed to the drum to prevent slippage. One flange of the drum 104 is provided with a gear teeth 110 which meshes with a small pinion 112 on a shaft having a hand crank 114. By turning the crank, the cable 102 causes the bucket to rock to the inclined position shown at 68', or to the dumping position shown at 68". A turn-buckle 116 in the cable 102 maintains the cable taut. Since the bucket may be practically filled before each dumping operation, the bucket is readily turned on its pivots 60 and 62.

In order to assist the lift of the bucket when in the lower position as at 68, and also to assist its return when in the position 68" should the arms 50 be over center by reason of the truck being headed on a down grade, tension springs 120 are provided connecting between the A-frames 42 and 44 and the elbow formed by the short sections 52 and arms 54 of the L arms 50.

The bucket 68, and bucket supports arms 50 are readily removed from the truck if desired, by lifting the bucket sufficiently to unhook the ends of the cables 92 from the loop or yoke 93 affixed to the arms 54 (see FIGURE 3) and unhooking the springs 120. Thereafter by lowering the bucket to the ground, the pulley blocks 70 can be unhooked from the yoke 93 affixed to the arms 54. (See FIGURE 3.) By pulling the pins 130 in the ends of the shaft 48, the arm sections 52 may be laterally slid from the shaft and the bucket and arms are thus removed from the truck. The pulley blocks 70 may be hooked to the A-frame, and the cables 92 also hooked to the truck sides in an out of the way manner. In a similar fashion the free end of the springs 120 may be hooked so as to secure them in an out of the way manner if unhooked from the arms 50.

Thereafter, the truck may be driven off leaving the loading apparatus behind. It will be understood that the loading apparatus can as readily be reassembled on the truck, by the reverse procedure described.

It will be seen that should the truck be headed down hill, there is a possibility that the bucket, in the position 68″, may move slightly over the center of shaft 48. In such case the springs 120 are tensioned and assist the initial return movement. The springs also assist the initial lifting of the bucket from the loading position shown.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. Loading apparatus for a dump truck having a frame, and a dump body pivotally mounted thereon, said dump body having an under frame and sides, a transverse shaft extending through the under frame centrally of the length thereof, "A" frames disposed on opposite sides of the body and projecting upwardly from the sides of the under frame and centrally of the length thereof and each having a pulley at the upper end, bucket arms pivoted on the opposite ends of the shaft and of L configuration, each having a short section pivoted on said shaft, and extending upwardly therefrom, and a bucket supporting arm extending at right angles from the upper end of the short section to form an elbow and projecting beyond the rear of the dump body, resilient tension means extending upwardly and connected between the elbow of each of the arms and a high point on the respective A-frame, said resilient tension means being stressed as the L arms move toward loading position, or toward dumping position, a loading bucket pivotally supported between and upon the ends of said arms, a cable winch mounted upon said dump body at the forward lower end thereof, cable means on each side of the dump body passing over one of said pulleys and connected at one end to one of said arms near the end thereof, and to said winch for lifting the arms to a substantially vertical position to locate the bucket over the dump body, and means carried on one of said arms for tilting the bucket with respect to the said one arm.

2. Loading apparatus according to claim 1 wherein means carried by the dump body are provided, for engaging each of the short sections to limit forward movement of said sections, when the bucket is elevated to dump position.

3. Loading apparatus according to claim 1 wherein flexible tension means extend from each A-frame to the end of the respective arms to limit the lower loading position of the bucket.

4. Loading apparatus according to claim 2, wherein flexible tension means extend from each A-frame to the end of the respective arms to limit the lower loading position of the bucket.

5. Loading apparatus according to claim 4, in which the flexible tension means, the cable means and the resilient tension means are readily disconnected from their respective L arms, and the L arms are readily removed from the shaft, to remove the loading apparatus L arms and bucket from dump body.

6. Loading apparatus according to claim 4 in which the flexible tension means is readily disconnected from the L arms when the L arms are raised from the bucket loading position, and in which the resilient tension means is readily disconnected from the elbows when the L arms are raised to a position in between the load and the dump positions, and the cable means is readily disconnected from the L arms after disconnecting the said flexible and resilient tension means and lowering the bucket to the ground, and in which the L arms are readily removed from the shaft after disconnecting the cable means therefrom.

7. Apparatus according to claim 6, wherein the L arms near the bucket ends are provided with a yoke, and the cable means each includes a pulley block having a hook engaging its respective yoke, and wherein the flexible tension means each comprises an end hook engaging its respective yoke, and wherein said hooks are readily disengaged from the yoke when tension is relieved.

References Cited

UNITED STATES PATENTS 2,352,068   6/1944   Beckwith _____ 214—78 X

FOREIGN PATENTS 627,879   9/1961   Canada.

HUGO O. SCHULZ, *Primary Examiner.*